Feb. 6, 1934. C. P. BRODHUN 1,946,190
CABLE
Filed Sept. 24, 1930
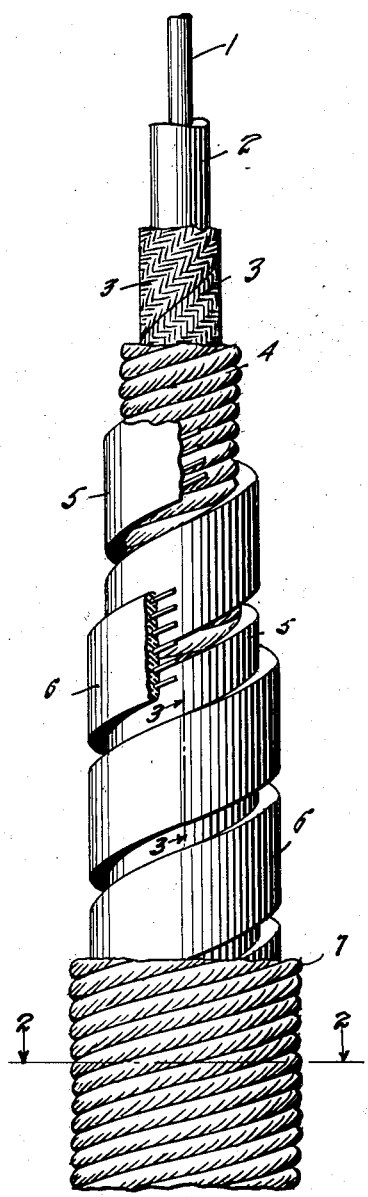
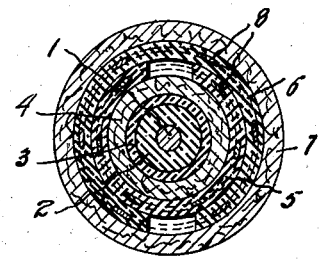
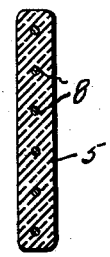
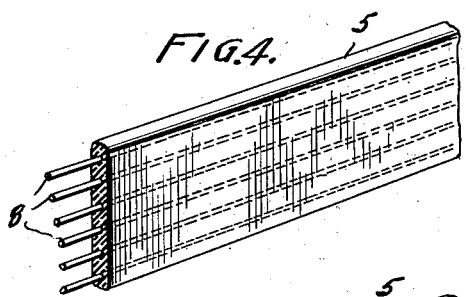
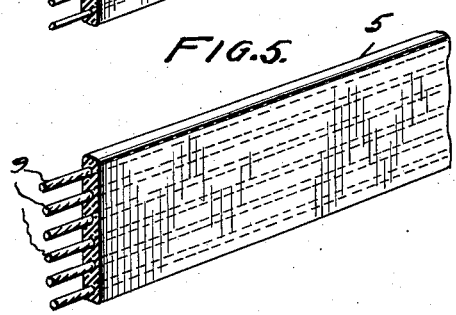
Inventor
CARL P. BRODHUN
By Semmes & Semmes
Attorneys Patented Feb. 6, 1934

1,946,190

UNITED STATES PATENT OFFICE 1,946,190

CABLE

Carl P. Brodhun, Wilkes-Barre, Pa.

Application September 24, 1930
Serial No. 484,217

2 Claims. (Cl. 173—267)

This invention relates in general to cables, and more particularly has reference to an armor for insulated electric cables.

The present application is a continuation in part of my prior copending application, Serial No. 307,171, filed on September 20, 1928, for cables, which has resulted in Patent No. 1,900,041, issued March 7, 1933.

Previous to this time, as is set forth in my aforementioned prior application, electric cables of the character I seek to produce, adapted for underground or submarine installation, have generally been encased in a metallic armor. Such armor as bands of steel wound around the cable, or a lead sheath, or both, have been employed to protect the conductor against accidental or mechanical injury. Wrappings of waterproofed textile protective coverings to resist the deleterious effects of exposure have also been employed, usually wound both under and over the metallic armor.

Notwithstanding such protective coverings, it has often been found necessary in the past to additionally protect the conductor of a cable by enclosing the same in terra cotta, wood, or metal conduits, or by providing even other coverings, or combinations of one or more of these, in an attempt to prolong the utility of such cables.

With particular reference to the metallic sheaths by which it has been sought to protect such cables, the use of the same has been demonstrated to be disadvantageous due to the well-known disturbances which are set up by extraneous metal in close proximity to a conductor of alternating currents. This is occasioned by the fact that alternating current is impeded by the presence of metal in the magnetic field of a conductor thereof.

Disturbances of this character have been found to be so pronounced in many cables of this character that it has been necessary to discard the same as unsuitable for use in carrying loads approaching those of what would be the normally rated capacity. The economic feature has also necessarily entered into the installation of such cables, particularly as substitutes for overhead wires where a multiplicity of coverings including metallic armor, conduits, or both have been used to enclose the cables. In such instances the cost involved in the production and installation of such cables has often made the use of other types of conductors more desirable.

It will be seen from the foregoing that it has, therefore, been the experience in the past, that while the use of underground cables is highly desirable as substitutes for overhead wires, that the cost of practical installations has often rendered the use of such practically prohibitive, if armored with metal or enclosed in conduits as has usually been found necessary for a permanent installation. From the utility standpoint, further, the metallic sheaths by reason of the presence of metal in the magnetic field of the conductor impeding the passage of alternating currents therethrough, practically negative the advantages of an underground cable, as compared with the ordinarily less desirable overhead installations.

In my parent application, Serial No. 189,117, filed May 5, 1927, I disclose a non-magnetic, non-metallic armor as a substitute for metallic armor, adapted to eliminate the disadvantages inherent in a metal armored cable, without appreciably sacrificing any of the protective qualities of a metal armor, and in such elimination provide for a very material decrease in the cost of the manufacture and utility of such cables.

In my first application I enumerated a number of materials capable of substitution for the metal windings formerly employed to armor cables to decrease the cost and increase the efficiency thereof. As is set forth in my later application, of which the present application is a continuation in part, I prefer to employ layers of strips of any suitable rubber compound, having the ingredients entering into the composition thereof of such a character that the rubber strip is adapted to afford substantially the same protection as would a metal strip. Thus the magnetic disturbances resulting from the use of metal may be eliminated, and the cost of manufacture as well as the weight of a cable of the same character considerably reduced.

In the use of an armor consisting of such rubber strips, however, I found that while a more highly desirable cable was produced than any formerly obtained, and that while the rubber strips apparently afford the best substitute for metal, that certain disadvantages obtain by reason of particular qualities inherent in rubber compounds, particularly the tendency of the same to crack. Manifestly this may be eliminated by increasing the elasticity of the rubber, but this is undesirable inasmuch as tough a composition of rubber as can practically be obtained without cracking is that most desirable. In order to overcome this disadvantage, I have provided for reinforcing the rubber strips so that the same may be exceedingly tough in composition as is desirable, without cracking of the same resulting, as will be disclosed herein.

The ordinary type of cable now in use has generally consisted essentially of one or more conductors suitably insulated, usually with joint or separate coatings of vulcanized rubber, covered with a wrapping of helically wound woven fabric strips, and provided with an outer covering of jute cord helically wound around the fabric strips. Armored cables have usually had a plurality of metal strips helically wound in staggered relation over the woven fabric strips, with a supplemental or cushion winding of jute cord helically wound therebetween. In some instances the fabric wrapping has been encased in the continuous sheath of lead or other metal. The fabric and jute cord windings have usually been impregnated with suitable compounds to increase the life of the same and prevent access of moisture.

I construct my cable in accordance with any of these conventional forms, except that I substitute for the metallic strips forming the armor, armor of non-magnetic, non-metallic material, preferably as has been previously stated, rubber strips of such composition that the same are as tough as can be practically obtained without cracking when wound around the cable or when the cable is flexed.

The present invention, consists in general of the provision of an electric cable intended primarily for underground insulations, although the same is adaptable to submarine or aerial use, in which the metal armor heretofore employed is eliminated and rubber strips substituted therefor. I reinforce the rubber strips employed to allow a composition of maximum toughness being used without the likelihood of cracking. The rubber strips have been found to resist the deleterious effects of exposure and mechanical injury with greater effectiveness than the former metallic armor cables, and allows for a decrease in the cost of the manufacture and weight of cables of this character. The electrical disturbances resulting from the use of metal are also eliminated.

An object of this invention is to provide an electric cable having an armor of extreme strength and durability.

Another object of this invention is to provide an electric cable having a non-magnetic and non-metallic armor.

Still another object of my invention is to provide a non-metallic armor which is reinforced to give sufficient strength.

Yet another object of this invention is to provide an electric cable having an armor composed of helically wound strips of material so positioned relatively to each other as to afford a fluid-tight protective covering for the cable.

With these and other objects in view, which may be apparent herefrom, my invention consists in the parts and combinations hereinafter set forth and claimed, with the distinct understanding that the details may be varied in actual construction without departing from the spirit and scope of the appended claims.

In order to render my invention more clearly understood, there are set forth in the accompanying drawing means for effecting the purposes hereof, but such drawings to be illustrative rather than limitative of my invention.

In the drawing forming a part of this specification:

Figure 1 is an elevational view of a covered cable except that the reinforced rubber strips forming the subject matter of my invention are shown as substituted for the former metallic strips.

Figure 2 is a top sectional view taken on line 2—2 of Figure 1.

Figure 3 is a sectional view of one of the rubber strips showing the strands of material longitudinally embedded therein.

Figure 4 is a perspective view of one of the rubber strips shown with a series of parallel wires arranged in the same plane and longitudinally embedded therein.

Figure 5 is a perspective view showing strands of textile material substituted for the wire shown in Figure 4.

Referring more particularly by numerals to the drawing, there is shown in Figure 1 a cable consisting of a central electric conductor 1, composed of any suitable highly conductive metal such, for example, as copper. The conductor is encased in suitable insulating material 2, which I prefer to be the ordinary continuous vulcanized rubber sheath, although any other desirable insulating medium may be employed. A wrapping of waterproofed braided fabric strip 3 is helically wound around the insulator sheath 2.

A jute cord 4 is helically wound around the tape or braid of impregnated woven fabric 3, or the layer 3 may be dispensed with entirely, if found desirable, and the jute cord wound directly around the insulating material 2. The jute cord is preferably thoroughly waterproofed with a saturation of asphaltum compound, paraffin or any other suitable impregnant. The winding of jute cord 4 is adapted to protect the insulating layer 2 and the fabric winding 3 if this is employed. Of course other suitable material may be substituted for the jute cord herein set forth. This fabric winding is primarily intended for the purpose of affording additional insulation and protection to the conductor 1 and insulation 2, and under certain circumstances may take some form other than a helically wound strip. It is desirable that this cover be impregnated with a suitable waterproofing medium such as an asphaltum compound, paraffin, or some other conventional water-proofing substance.

To afford still further insulation and protection for the conductor and the elements 2 and 3, I provide a layer of material 4. As shown, this preferably is a winding of cord thoroughly impregnated with a water-proofing compound, such, for example, as mentioned above. Of course, some other material may be substituted for the jute cord herein set forth. Should the insulation 3 be dispensed with, the cord 4, or its substitute will be applied directly on the insulating material 2.

The cord 4 also serves as a cushion or pad for a novel protective armor to be hereinafter described.

I have found that a rubber compound which is suitably reinforced possesses these desired characteristics. The compound may be made up of rubber combined with an appropriate mineral or organic filler. A rubberized fabric, or in fact any flexible waterproof armor material may be substituted for the rubber compound referred to herein. Such a material does not interfere in any way with the electric current passing through the conductor 1. At the same time, this compound is adapted to form a close fitting and moisture-proof protective covering for the cables. The tensile strength and durability of this material are materially increased by the reinforcing means, which, at the same time do not seriously affect the resiliency of the armor.

While the armor may be applied in a variety of forms, I prefer that strips of the armor material be tightly wound about the cord 4. There is therefore shown in the drawing a strip 5 of my preferred armor material, which is shown wrapped upon the cable in the form of a helix. My material is particularly adapted for a strip armor because the resiliency of the rubber compound insures a tight fit, both with respect to the jute cord 4 and the abutting sides of the strip itself. It is desirable that the strip 5 be so wound upon the cable that the completed helical strip be, in effect, an integral sheath.

In order to avoid any possible seepage of water or moisture through the joints formed by the abutting sides of the strip 5, I have provided an auxiliary strip 6 which is preferably similar in all respects to strip 5. Under certain circumstances, however, this strip may be modified to meet the exigencies of any given situation. The strip 6 is preferably wrapped upon strip 5 and in the same direction as strip 5. Strip 6 is so positioned as to directly fall over the joints formed by the abutting sides of the cable 5. The helical joints of strips 5 and 6 are, therefore, staggered with respect to each other, and practically eliminate the possibility of moisture seeping into the innermost elements of the cable.

The reinforcing means for the armor are shown more particularly in Figures 3, 4 and 5. If the armor is applied in the form of strips, I prefer that the reinforcement be a plurality of wires or other reinforcing means which are embedded in the rubber compound. These wires or reinforcements may run longitudinally of the strip, and this is my preferred embodiment. They may, however, under certain conditions, be placed diagonally or transversely in the strip, if a particular situation so requires. Of course, if the armor is applied in the form of a sheath, the reinforcements may run longitudinally of the cable, or may be helically embedded in the sheath, or take the form of a plurality of annuluses.

The reinforcements 8 depicted in Figure 4 are a plurality of metal wires embedded in the strip 5 and running longitudinally of the strip. The amount of metal in these wires is not sufficient to seriously impede the current, and furthermore they are preferably formed of a metal of low magnetic value such as zinc or lead.

In Figure 5, the reinforcements 9 are a series of longitudinal cords, which may be twisted or treated to increase their strength. The use of these cords eliminates any possible interference with the electric current. The particular arrangement of the cords 9 in the strip 5 is subject to the same modifications as referred to above in connection with the wires 8.

It will be noted that the use of the reinforcements in the armor strips or sheath do not affect to any appreciable extent the resiliency of the member, and at the same time enhance the strength of the armor. The resiliency of the armor is particularly desirable when it is applied in the form of strips, for tight winding is facilitated when the material is resilient. A cable armor is therefore obtained of increased strength, of equal resistance, and with the tendency to chip and deteriorate eliminated.

Upon the armor which is thus placed upon the cable, there is superimposed an outer cover which is shown in the drawing as composed of jute cord helically wound about the armor. This cord is preferably impregnated with a suitable waterproofing material, and inasmuch as this cord is directly exposed, it is desirable that the impregnation be more thorough and the water-proofing medium more concentrated than is necessary in the case of the cord 4. This exterior cover serves as an effective seal for the entire cable, and also is a protection against mechanical injury to the cable.

There is provided by this invention a cable intended primarily for underground use, although adapted to submarine and aerial installations as well. My improved cable has the strength and durability of the metal-armored cables, and at the same time eliminates the possibility of interference with the electrical current. Furthermore my armor makes for a lighter cable. The reinforcements give added strength to the rubber compound without appreciably impairing its resiliency or non-magnetic properties.

While I have shown and described the preferred embodiment of my invention, I wish it to be understood that I do not confine myself to the precise details of construction herein set forth, by way of illustration, as it is apparent that many changes and variations may be made therein, by those skilled in the art, without departing from the spirit of the invention, or exceeding the scope of the appended claims.

I claim:

1. An electric cable comprising a conductor having a plurality of layers of insulating and water-proofing material therearound, and strips of stiff bendable rubber compound having longitudinally arranged wires embedded therein wound around the insulating material to armor the cable.

2. An electric cable comprising a conductor having a plurality of layers of insulating and waterproofing material therearound a pair of windings thereover comprising strips of relatively stiff but bendable rubber compound with longitudinally arranged wires embedded therein to armor the cable and a winding of insulation and protective material therearound.

CARL P. BRODHUN.